US012580977B2

(12) United States Patent

Castrejon, III et al.

(10) Patent No.: US 12,580,977 B2
(45) Date of Patent: Mar. 17, 2026

(54) INTELLIGENT PROTOCOL IMPLEMENTATION IN A DISTRIBUTED COMPUTING SYSTEM

(71) Applicant: BANK OF AMERICA CORPORATION, Charlotte, NC (US)

(72) Inventors: Tomas M. Castrejon, III, Fort Mill, SC (US); Kelly Ann Galligan Davila, Charlotte, NC (US); Anuja Mishra, Charlotte, NC (US); Mark Alan Odiorne, Waxhaw, NC (US)

(73) Assignee: BANK OF AMERICA CORPORTION, Charlotte, NC (US)

( * ) Notice: Subject to any disclaimer, the term of this patent is extended or adjusted under 35 U.S.C. 154(b) by 313 days.

(21) Appl. No.: 18/141,180

(22) Filed: Apr. 28, 2023

(65) Prior Publication Data

US 2024/0364774 A1 Oct. 31, 2024

(51) Int. Cl.
*H04L 67/01* (2022.01)
*H04L 67/50* (2022.01)

(52) U.S. Cl.
CPC ............ *H04L 67/01* (2022.05); *H04L 67/535* (2022.05)

(58) Field of Classification Search
CPC .............................. H04L 67/01; H04L 67/535
See application file for complete search history.

(56) References Cited

U.S. PATENT DOCUMENTS

| | | | |
|---|---|---|---|
| 7,028,290 B2 | 4/2006 | Srivastava et al. | |
| 8,527,956 B2 | 9/2013 | Bell, Jr. et al. | |
| 9,389,986 B2 | 7/2016 | Abraham et al. | |
| 9,626,413 B2 | 4/2017 | Mosko | |
| 9,639,278 B2 | 5/2017 | Kimmel et al. | |
| 9,721,190 B2 | 8/2017 | Vijayanarasimhan et al. | |
| 9,916,227 B2 | 3/2018 | Lachambre et al. | |
| 10,417,731 B2 | 9/2019 | Feit et al. | |
| 10,733,087 B2 | 8/2020 | Wiener et al. | |
| 10,902,547 B2 | 1/2021 | Feit et al. | |
| 11,307,062 B2 | 4/2022 | Zafar et al. | |
| 11,531,859 B2 | 12/2022 | Yang et al. | |
| 2007/0006151 A1 | 1/2007 | Conway et al. | |
| 2009/0089745 A1 | 4/2009 | Johnson et al. | |
| 2010/0235823 A1 | 9/2010 | Garbers et al. | |
| 2012/0133654 A1 | 5/2012 | Redgrave et al. | |
| 2014/0130020 A1 | 5/2014 | Boshernitsan et al. | |
| 2015/0261653 A1 | 9/2015 | Lachambre et al. | |
| 2017/0308789 A1 | 10/2017 | Langford et al. | |
| 2019/0138511 A1 | 5/2019 | Margiolas | |

(Continued)

*Primary Examiner* — Suraj M Joshi

(74) *Attorney, Agent, or Firm* — Moore & Van Allen PLLC; Gabrielle M. Carlini

(57) ABSTRACT

Systems, computer program products, and methods are described herein for intelligent protocol implementation in a distributed computing system. The present disclosure is configured to monitor usage data for a plurality of network devices; receive, from a first network device, a protocol dataset; analyze the protocol dataset using a first machine learning engine; determine, based on an output of the first machine learning engine, at least one variable correlated with the protocol dataset; and instruct a second machine learning engine to analyze usage data associated with the at least one variable, wherein the second machine learning engine is configured to generate a data visualization on a display of the first network device.

17 Claims, 5 Drawing Sheets

(56)             References Cited

U.S. PATENT DOCUMENTS

| | | | |
|---|---|---|---|
| 2023/0134392 A1* | 5/2023 | D'Alessandro ........ | G06Q 20/22 |
| | | | 705/39 |
| 2023/0186075 A1* | 6/2023 | Dutta .................... | G06N 3/045 |
| | | | 706/15 |
| 2024/0036967 A1* | 2/2024 | Akkapeddi ......... | G06F 11/0793 |

* cited by examiner

INTELLIGENT PROTOCOL IMPLEMENTATION IN A DISTRIBUTED COMPUTING SYSTEM

TECHNOLOGICAL FIELD

Example embodiments of the present disclosure relate to systems and methods for intelligently implementing a protocol in a distributed computing system.

BACKGROUND

Conventional methods of using machine learning to implement a system-wide protocol or workflow require extensive computational resources to aggregate and process data which is stored in a distributed manner across a computing system. However, a user typically only wishes to evaluate a few metrics in order to more efficiently study the effects of the implementation across a large number of network devices in the system. As such, there is a need for a system to intelligently evaluate the effects of a protocol in a distributed computing system.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for processing data using an optimized machine learning architecture is presented. The system may include at least one non-transitory storage device and at least one processor coupled to the at least one non-transitory storage device, where the processing device is configured to execute computer program code comprising computer instructions configured to cause said at least one processor to perform the following operations: monitor usage data for a plurality of network devices; receive, from a first network device, a protocol dataset; analyze the protocol dataset using a first machine learning engine; determine, based on an output of the first machine learning engine, at least one variable correlated with the protocol dataset; and instruct a second machine learning engine to analyze usage data associated with the at least one variable, where the second machine learning engine is configured to generate a data visualization on a display of the first network device.

In some embodiments, the protocol dataset may include at least one of: a protocol objective, information identifying one or more of the plurality of network devices, information identifying one or more applications, security data, user data, and workflow data.

In some embodiments, the processing device may be further configured to execute computer program code comprising computer instructions configured to cause said at least one processor to perform the following operations: transmit, to the first network device, the at least one variable correlated with the protocol dataset; and receive, from the first network device, an approval of the at least one variable correlated with the protocol dataset.

In some embodiments, the second machine learning engine may be further configured to: identify a data trend associated with the at least one variable; and instruct the one or more of the plurality network devices to perform an action.

In some embodiments, the usage data may include at least one of: network traffic data, application usage data, user activity data, system error data, and historical query data.

In some embodiments, the at least one variable may be further correlated with a user-defined objective of the protocol dataset, where the user-defined objective is received from the first network device.

In some embodiments, the display may include an extended reality (XR) interface device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
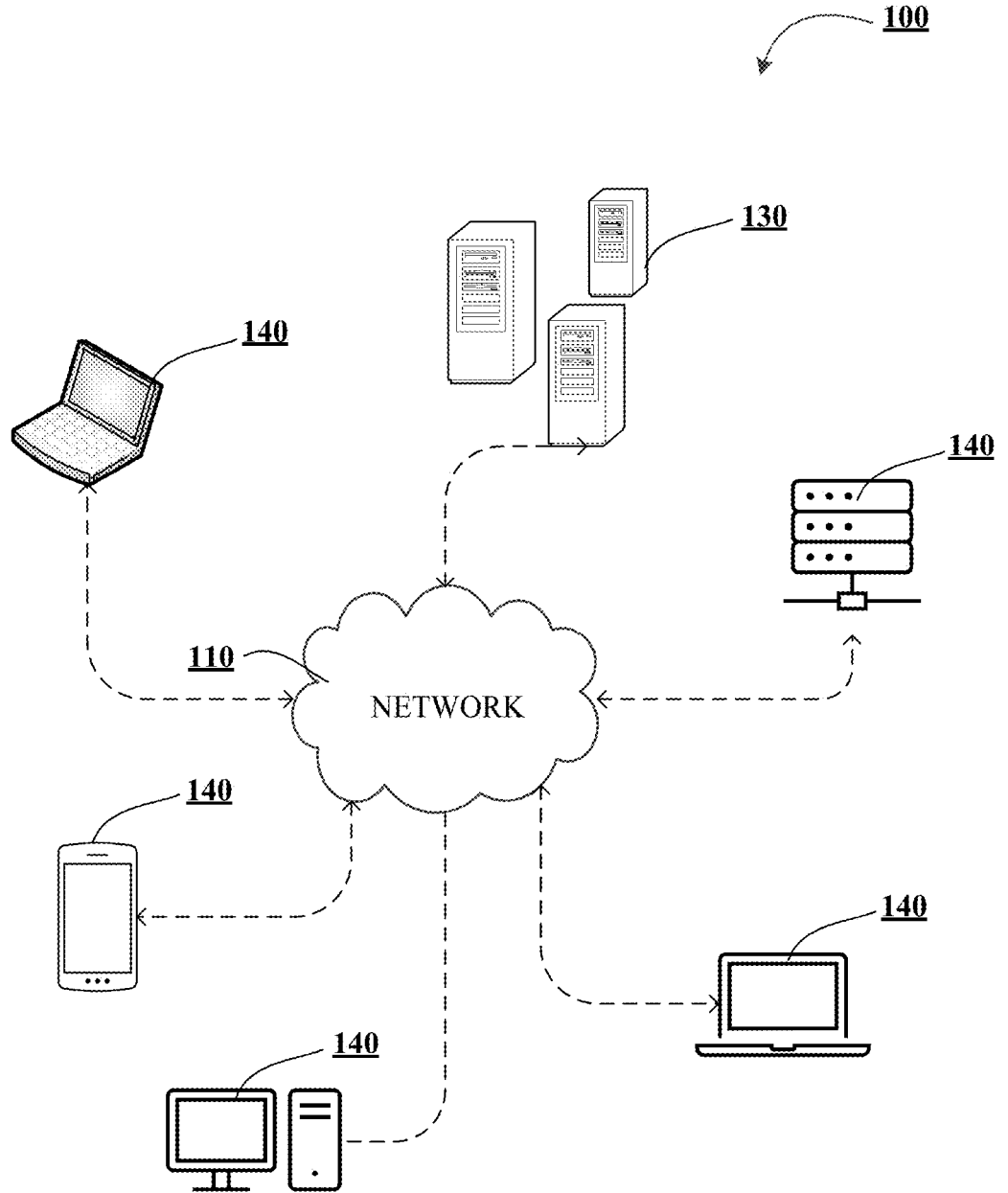
Figure 1B:
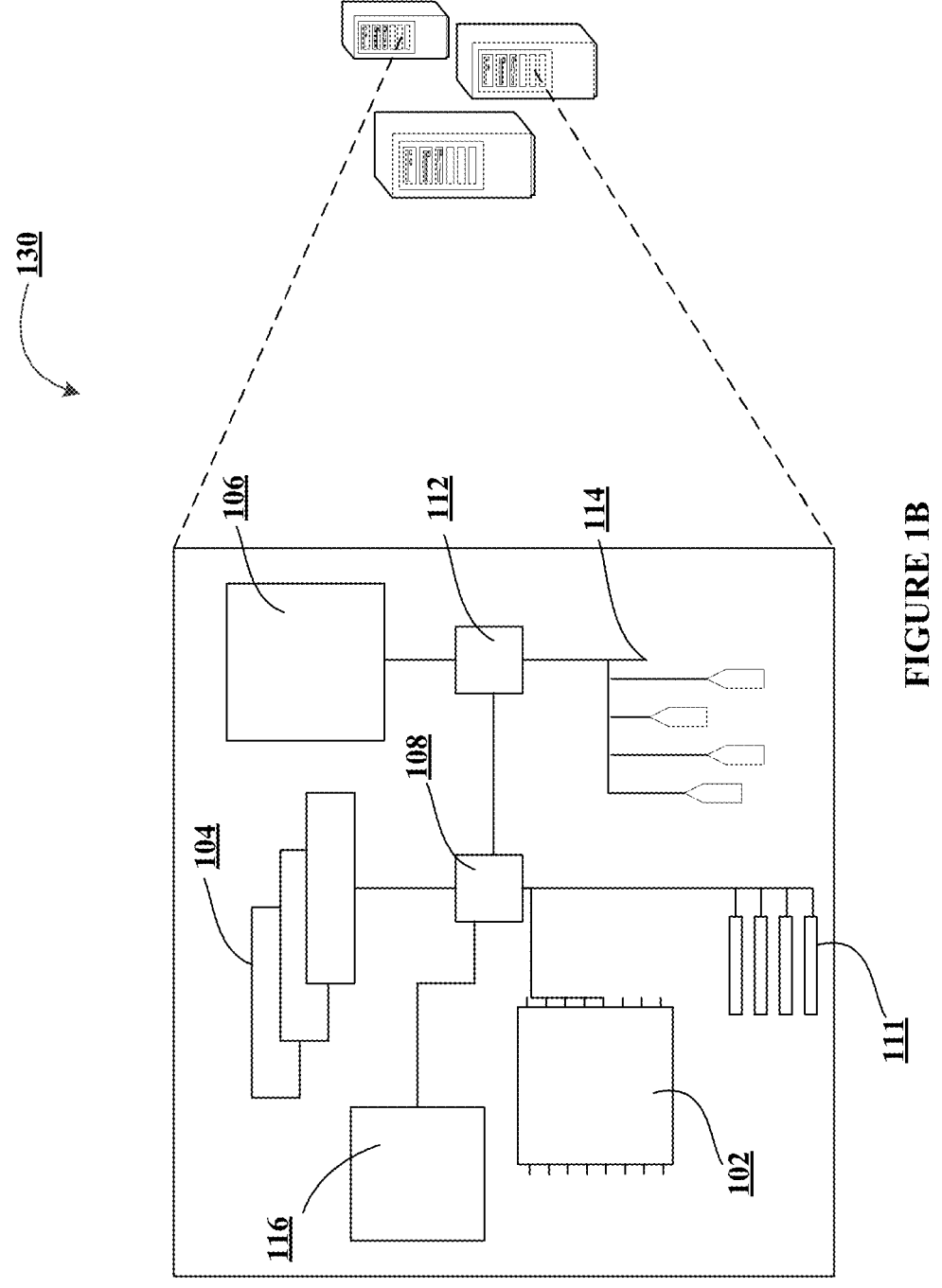
Figure 1C:
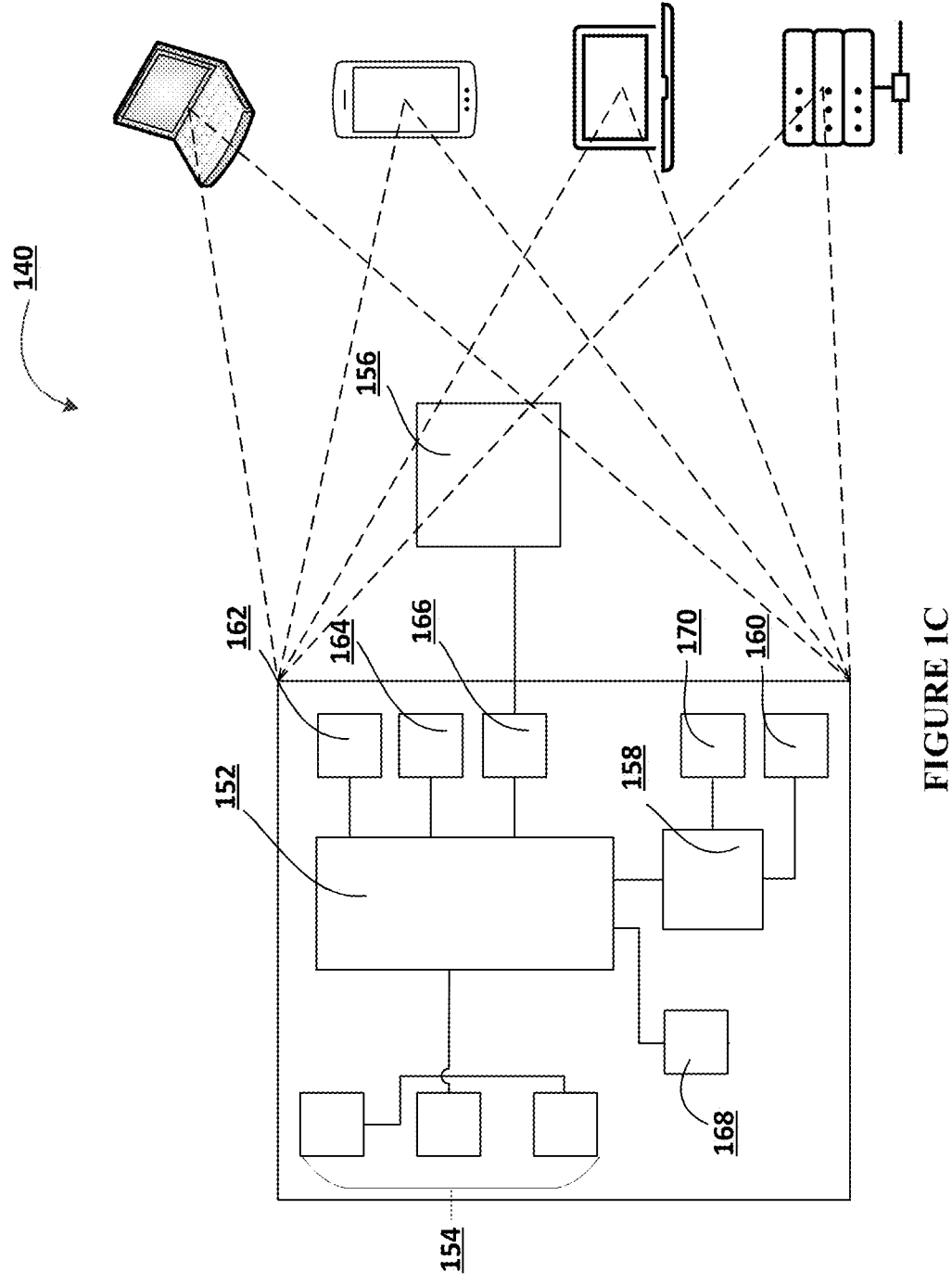
Figure 2:
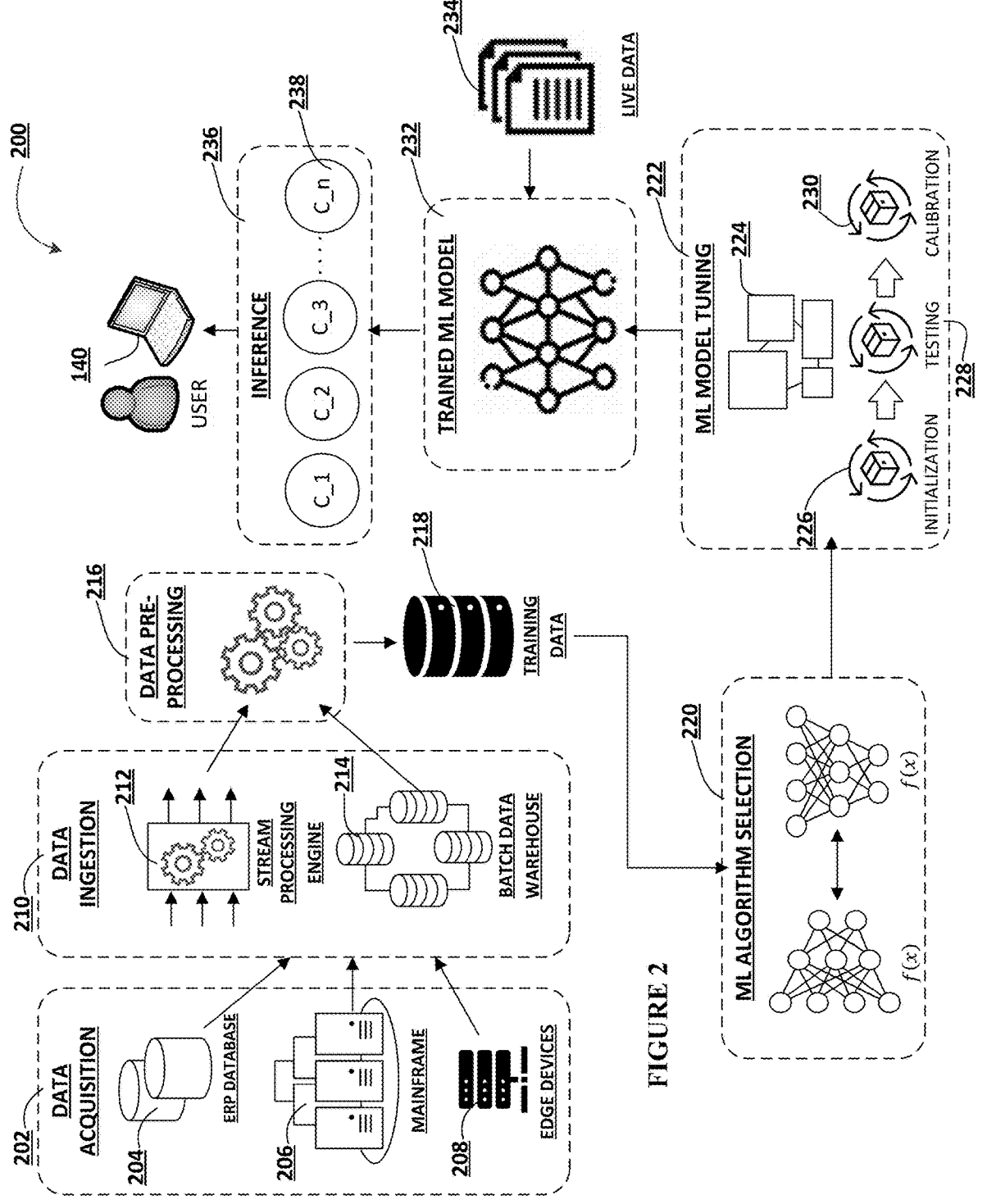
Figure 3:
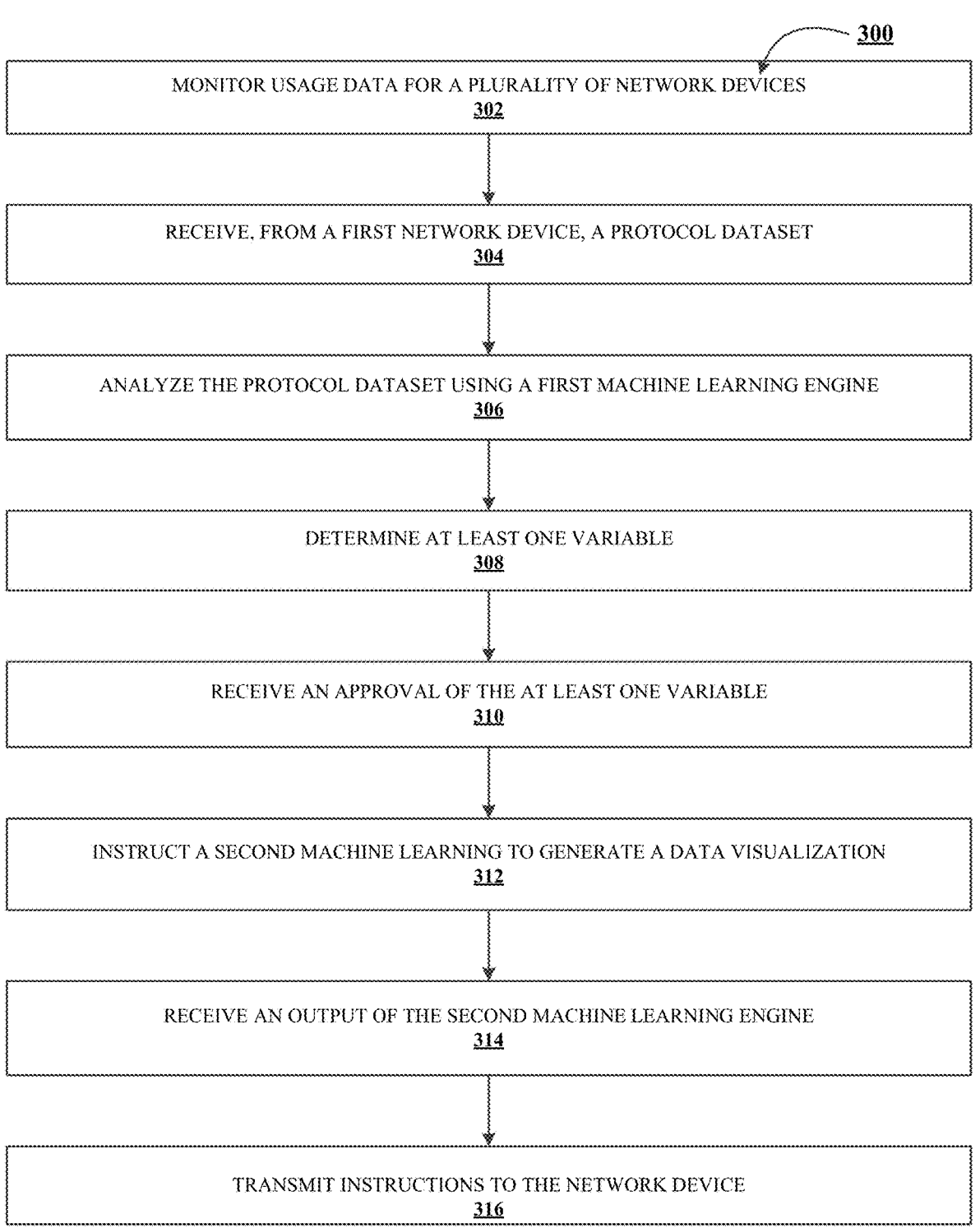

FIGS. 1A-1C illustrates technical components of an exemplary distributed computing environment for intelligent protocol implementation, in accordance with an embodiment of the disclosure;

FIG. 2 illustrates an exemplary machine learning (ML) subsystem architecture 200, in accordance with an embodiment of the invention; and FIG. 3 illustrates a process flow for intelligent protocol implementation, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In a distributed computing system, such an entity system, system-wide analysis of a protocol implementation requires extensive computational resources to both aggregate large amounts of disparate data and to process said data. While these conventional systems are useful to provide entity-wide data insights, they are not optimized to target the most salient variables according to user-specific objectives. The system provided herein solves this problem by providing two machine learning engines. The first machine learning engine is configured to identify, based on system-wide historical data and current data, the most salient variables associated with a particular protocol implementation. The first engine may then provide those variables to one or more secondary machine learning engines, which are each trained to generate data visualizations of one or more variable types. This allows for faster data processing times and allows a lower-powered device, such as a personal network device, to host a second machine learning engine which generates visualizations of data collected by the system-wide first machine learning engine.

What is more, the present disclosure provides a technical solution to a technical problem. As described herein, the technical problem involves a tradeoff between the computational power of a system-wide machine learning engine and the faster processing times of a local machine learning engine. The technical solution presented herein reduces the need for the tradeoff by using a first engine to generate entity data insights and then training a plurality of secondary, local machine learning engines to generate visualizations for a particular user device. In particular, the present disclosure reduces the amount of computing resources, such as processing resources, storage resources, network resources, and/or the like, that are being used, as well as reduces network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Furthermore, the present invention provides the functional benefit of allowing a user to engage with a single user interface for data visualization in an extended reality (XR) environment. XR may refer to all real-and-virtual combined environments and human-machine interactions generated by computing technology and wearables. Representative forms of XR may include augmented reality (AR), virtual reality (VR), mixed reality (MR), and the areas interpolated among them. The levels of virtuality range from partially sensory inputs to immersive virtuality, also called VR. In this regard, the present invention focuses on electronic protocols (and the network devices/applications implicated in the protocols) and represents machine-learning-generated data visualizations within an XR environment. A user may then visualize the effects of a system-wide protocol implementation via an XR platform (accessible using a virtual/augmented/mixed reality device) and may interact with data in a more user-friendly, intuitive manner than is available in conventional systems.

FIGS. 1A-1C illustrate technical components of an exemplary distributed computing environment for an optimized machine learning architecture 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s)

140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier.

The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots . C\_n$ 238) or observations based on defined classifications, represent possible solutions to a decision based on certain conditions, model complex relationships between inputs and outputs to find patterns in data or capture a statistical structure among variables with unknown relationships, and/or or the like. On the other hand, machine learning models trained using unsupervised learning algorithms may be used to group (e.g., $C\_1, C\_2 \ldots . C\_n$ 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for intelligent protocol implementation, in accordance with an embodiment of the disclosure. The process may begin at block 302, wherein the system 130 monitors usage data across a plurality of end-point or network devices 140. Usage data may comprise any information relating to computing activity within the operating environment, such as network traffic data, application usage data, user activity data, system error logs, historical query logs, and/or the like. The process flow may then continue to block 304, where the system 130 receives, from a first network device, a protocol dataset comprising information associated with a new protocol implementation in the system and/or an update to an existing protocol. For example, the protocol dataset may comprise a protocol objective or user-defined objective identifying one or more goals of the protocol (i.e. decreased processing times, decreased number of security events, increased usage of particular applications, etc.). The protocol dataset may further include data such as information identifying one or more of the plurality of network devices affected by the protocol, information identifying one or more applications affected by the protocol, security and/or encryption data, affected user and/or account data, and workflow data (which may comprise source code of the protocol and/or information identifying changes to existing protocols).

The process flow may then continue to block 306, where a first machine learning engine analyzes the protocol dataset in combination with the system-wide usage data. The structure and functions of the first machine learning engine are discussed in greater detail with respect to FIG. 2. Based on an output of the first machine learning engine, the system may determine 308 at least variable correlated with the protocol dataset. Variables may specifically identify a particular application and/or a category of application, a user and/or user category, and/or other related data such as a temporal data, location-based data, usage data, and/or the like which is correlated with the objective of the protocol dataset, such that the variables may individually or in combination function as success metrics of the implementation. For example, for a protocol designed to decrease the response time to a network incident, the system may determine that the behavior associated with a particular software application is strongly correlated with system-wide response time in general.

In some embodiments, the process flow may proceed directly to block 312. Additionally or alternatively, the process flow may then continue to block 310, where the system may transmit, to the first network device, the at least one variable correlated with the protocol dataset and receive, from the first network device, an approval of the at least one variable correlated with the protocol dataset. Therefore, a user of the first network device may have the opportunity to review the output of the first machine engine and accept or decline the variable as a proxy for the protocol objective. If the user declines the output of the first machine learning engine, the process flow may revert to block 306. If the user accepts the output of the first machine learning engine, the process flow may continue to block 312.

At block 312 of the process flow, in some embodiments, the system may instruct a second machine learning engine to analyze usage data associated with the at least one variable and generate a data visualization on a display of the first network device. The structure and functions of the second machine learning engine are discussed in greater detail with respect to FIG. 2. The second machine learning engine may be hosted on an end-point or network device 140, such as the first network device. In some embodiments, the system 130 may comprise a plurality of secondary machine learning engines, where each secondary machine learning engine is hosted on an end-point or network device 140. Each secondary machine learning engine may be instructed to analyze usage data associated with one or more variables provided by the first machine learning engine. As such, a single network device may host a plurality of secondary machine learning engines, where each secondary machine learning engine analyzes a different variable or category of variables. In some embodiments, when instructing the second machine learning engine, the system may also transmit the protocol dataset and/or the user-defined objective of the protocol dataset. In some embodiments, the display comprises an extended reality (XR) interface device, and the visualization may be a three-dimensional, interactive, data visualization.

The process flow may then continue to block 314, wherein the second machine learning engine may be configured to identify a data trend or insight associated with the at least one variable. In some embodiments, the system may then transmit instructions to the first network device to perform an action based on the data trend. Additionally or alternatively, the second machine learning engine may be configured to directly instruct the first network device to perform the action. The action may comprise any steps relating to the protocol dataset, such as updating a workflow with new instructions, pausing the protocol implementation, transmitting a report, updating a user interface, and/or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for intelligent protocol implementation, the system comprising:
at least one non-transitory storage device; and
at least one processor coupled to the at least one non-transitory storage device, wherein the processing device is configured to execute computer program code comprising computer instructions configured to cause said at least one processor to perform the following operations:
monitor usage data for a plurality of network devices in a distributed computing environment;
receive, from a first network device, a protocol dataset comprising source code of a protocol implemented within the distributed computing environment;
analyze the protocol dataset using a first machine learning engine;
determine, based on an output of the first machine learning engine, at least one variable correlated with the protocol dataset; and
instruct a second machine learning engine to analyze usage data associated with the at least one variable, wherein the second machine learning engine is configured to generate a data visualization on an extended reality (XR) display of the first network device.

2. The system of claim 1, wherein the protocol dataset further comprises at least one of: a protocol objective, information identifying one or more of the plurality of network devices, information identifying one or more applications, security data, user data, and workflow data.

3. The system of claim 1, wherein the processing device is further configured to execute computer program code comprising computer instructions configured to cause said at least one processor to perform the following operations:
transmit, to the first network device, the at least one variable correlated with the protocol dataset; and
receive, from the first network device, an approval of the at least one variable correlated with the protocol dataset.

4. The system of claim 1, wherein the second machine learning engine is configured to: identify a data trend associated with the at least one variable; and instruct the one or more of the plurality network devices to perform an action.

5. The system of claim 1, wherein the usage data comprises at least one of: network traffic data, application usage data, user activity data, system error data, and historical query data.

6. The system of claim 1, wherein the at least one variable is further correlated with a user-defined objective of the protocol dataset, wherein the user-defined objective is received from the first network device.

7. A computer program product for intelligent protocol implementation, the computer program product comprising a non-transitory computer-readable medium comprising code causing an apparatus to:
monitor usage data for a plurality of network devices in a distributed computing environment;
receive, from a first network device, a protocol dataset comprising source code of a protocol implemented within the distributed computing environment;
analyze the protocol dataset using a first machine learning engine;
determine, based on an output of the first machine learning engine, at least one variable correlated with the protocol dataset; and
instruct a second machine learning engine to analyze usage data associated with the at least one variable, wherein the second machine learning engine is configured to generate a data visualization on an extended reality (XR) display of the first network device.

8. The computer program product of claim 7, wherein the protocol dataset further comprises at least one of: a protocol objective, information identifying one or more of the plurality of network devices, information identifying one or more applications, security data, user data, and workflow data.

9. The computer program product of claim 7, wherein the apparatus is further configured to:
transmit, to the first network device, the at least one variable correlated with the protocol dataset; and
receive, from the first network device, an approval of the at least one variable correlated with the protocol dataset.

10. The computer program product of claim 7, wherein the second machine learning engine is configured to:
identify a data trend associated with the at least one variable; and
instruct the one or more of the plurality network devices to perform an action.

11. The computer program product of claim 7, wherein the usage data comprises at least one of: network traffic data, application usage data, user activity data, system error data, and historical query data.

12. The computer program product of claim 7, wherein the at least one variable is further correlated with a user-defined objective of the protocol dataset, wherein the user-defined objective is received from the first network device.

13. A method for intelligent protocol implementation, the method comprising:
monitoring usage data for a plurality of network devices in a distributed computing environment;
receiving, from a first network device, a protocol dataset comprising source code of a protocol implemented within the distributed computing environment;
analyzing the protocol dataset using a first machine learning engine;
determining, based on an output of the first machine learning engine, at least one variable correlated with the protocol dataset; and
instructing a second machine learning engine to analyze usage data associated with the at least one variable, wherein the second machine learning engine is configured to generate a data visualization on an extended reality (XR) display of the first network device.

14. The method of claim 13, wherein the protocol dataset further comprises at least one of: a protocol objective, information identifying one or more of the plurality of network devices, information identifying one or more applications, security data, user data, and workflow data.

15. The method of claim 13, wherein the second machine learning engine is configured to: identify a data trend associated with the at least one variable; and instruct the one or more of the plurality network devices to perform an action.

16. The method of claim 13, wherein the usage data comprises at least one of: network traffic data, application usage data, user activity data, system error data, and historical query data.

17. The method of claim 13, wherein the at least one variable is further correlated with a user-defined objective of the protocol dataset, wherein the user-defined objective is received from the first network device.

* * * * *